(12) United States Patent
Miyata (10) Patent No.: US 8,860,965 B2
(45) Date of Patent: Oct. 14, 2014

(54) INFORMATION PROCESSING APPARATUS AND INFORMATION PROCESSING METHOD

(75) Inventor: Yuji Miyata, Aichi-ken (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 62 days.

(21) Appl. No.: 13/426,458

(22) Filed: Mar. 21, 2012

(65) Prior Publication Data

US 2013/0010327 A1    Jan. 10, 2013

(30) Foreign Application Priority Data

Jul. 8, 2011 (JP) ................. 2011-151526

(51) Int. Cl.
| | |
|---|---|
| *G06F 3/12* | (2006.01) |
| *G06F 3/09* | (2006.01) |
| *G06F 3/14* | (2006.01) |
| *H04W 4/00* | (2009.01) |

(52) U.S. Cl.
CPC ............ *G06F 3/1204* (2013.01); *G06F 3/1231* (2013.01); *G06F 3/1292* (2013.01); *G06F 3/1285* (2013.01); *G06F 3/1226* (2013.01); *G06F 3/1236* (2013.01); *H04W 4/00* (2013.01)
USPC .......................... 358/1.13; 358/1.15; 358/1.16

(58) Field of Classification Search
None
See application file for complete search history.

(56) References Cited

U.S. PATENT DOCUMENTS

| | | | | |
|---|---|---|---|---|
| 8,050,709 B2* | 11/2011 | Hall et al. | ............... | 455/556.1 |
| 2012/0033244 A1* | 2/2012 | Kohno | ................ | 358/1.14 |

FOREIGN PATENT DOCUMENTS

| | | |
|---|---|---|
| JP | H08-339337 A | 12/1996 |
| JP | H11-259398 A | 9/1999 |
| JP | 2006-123239 A | 5/2006 |
| JP | 2010-028545 A | 2/2010 |

* cited by examiner

*Primary Examiner* — Mark Zimmerman
*Assistant Examiner* — Darryl V Dottin
(74) *Attorney, Agent, or Firm* — Merchant & Gould PC (57) ABSTRACT

A non-transitory computer-readable medium having an information processing program readable by a computer in an information processing apparatus including a connection unit connected to a relay device that a target device is wirelessly connected to, the information processing program causes the computer to perform operations including: storing device specification information for specifying the target device and relay device identification information for identifying the relay device in a storage unit so as to be associated with each other; displaying a plurality of the device specification information stored in the storage unit; accepting the device specification information from the plurality of the displayed device specification information through an input unit; and connecting the connection unit to the relay device identified by the relay device identification information stored in the storage unit so as to be associated with the designated device specification information.

12 Claims, 9 Drawing Sheets

| DEVICE NAME | DEVICE IP ADDRESS | AP IDENTIFIER |
|---|---|---|
| HOME PRINTER | 172.16.10.150 | HOMEAP |
| FIRST FLOOR PRINTER A | 192.168.1.3 | OFFICEAP1 |
| FIRST FLOOR PRINTER B | 192.168.1.6 | OFFICEAP1 |
| SECOND FLOOR PRINTER | 192.168.1.3 | OFFICEAP2 |
| FIFTH FLOOR PRINTER | 172.51.40.170 | OFFICEAP5 |

| AREA A | AREA B | AREA C |
|---|---|---|
| FIRST FLOOR PRINTER A | MFC-5000X | HOME PRINTER |
| FIRST FLOOR PRINTER B | MFC-5100X | FIFTH FLOOR PRINTER |
| ... | ... | ... |

FIG. 4D

| NO. | MODEL NAME | DEVICE IP ADDRESS |
|---|---|---|
| 1 | MFC-5000X | 192.168.1.0 |
| 2 | MFC-3500 | 192.168.1.3 |
| 3 | MFC-4000 | 192.168.1.6 |
| 4 | MFC-5100X | 192.168.1.4 |

INFORMATION PROCESSING APPARATUS AND INFORMATION PROCESSING METHOD

CROSS-REFERENCE TO RELATED APPLICATIONS

This application claims priority from Japanese Patent Application No. 2011-151526 filed on Jul. 8, 2011, the entire subject matter of which is incorporated herein by reference.

TECHNICAL FIELD

The present invention relates to an information processing apparatus and an information processing method.

BACKGROUND

There have been proposed a method in which a mobile information terminal, such as a personal computer, uses one printer through a wireless LAN. In this method, the information terminal is connected to an access point, to which one printer is connected, in an infrastructure mode so as to allow the information terminal to transmit an instruction to perform a printing process to the one printer through the access point.

SUMMARY

In the above-described method, when the printer that the user wants to use is not connected to the access point to which the information terminal is connected, it is necessary to connect the information terminal to another access point. In general, the information terminal displays only an SSID (abbreviation of Service Set Identifier) of the access point on a screen thereof for enabling the user to select the access point, it is difficult to determine whether the printer that the user wants to use is connected to the selected access point before the information terminal is connected to the access point. Therefore, the user is required to repeat the selection of the access point until the access point is selected to which the printer desired to be used is connected.

Therefore, illustrative aspects of the invention provide a technique capable of reducing a burden of a user when an information processing apparatus is connected to the device that the user wants to use.

According to one illustrative aspect of the invention, there is provided a non-transitory computer-readable medium having an information processing program stored thereon and readable by a computer mounted in an information processing apparatus comprising a connection unit configured to establish a wireless connection with a relay device that a target device is wirelessly connected to. The information processing program, when executed by the computer, causes the computer to perform operations comprising: a storage control process; a display process; an accepting process; and a connection process. The storage control process is of storing device specification information for specifying the target device and relay device identification information for identifying the relay device in a storage unit so as to be associated with each other. The display process is of displaying a plurality of the device specification information stored in the storage unit on a display unit. The accepting process is of accepting designation of the device specification information from the plurality of the device specification information displayed on the display unit by the display process through an input unit. The connection process is of connecting the connection unit to the relay device identified by the relay device identification information that is stored in the storage unit so as to be associated with the designated device specification information accepted by the accepting process.

According to another illustrative aspect of the invention, there is provided an information processing apparatus comprising: a storage unit; a display unit; an accepting unit; and a connection unit. The storage unit is configured to store: device specification information for specifying a target device; and relay device identification information for identifying a relay device so as to be associated with each other. The display unit is configured to display the plurality of the device specification information stored in the storage unit. The accepting unit is configured to accept designation of the device specification information from the plurality of the device specification information displayed by the display unit. The connection unit is configured to establish a connection with the relay device that is identified by the relay device identification information stored in the storage unit so as to be associated with the designated device specification information accepted by the accepting unit.

According to still another illustrative aspect of the invention, there is provided an information processing method configured to be performed by an information processing apparatus comprising a connection unit configured to establish a wireless connection with a relay device that a target device is connected to. The information processing method comprises: a storage control step; a display step; an accepting step; and a connection step. The storage control step is of storing device specification information for specifying the target device and relay device identification information for identifying the relay device in a storage unit so as to be associated with each other. The display step is of displaying a plurality of the device specification information stored in the storage unit on a display unit. The accepting step is of accepting designation of the device specification information from the plurality of the device specification information displayed on the display unit through an input unit. The connection step is of connecting the connection unit to the relay device identified by the relay device identification information that is stored in the storage unit so as to be associated with the designated device specification information accepted by the accepting step.

According to the illustrative aspects of the invention, when receiving the device specification information, the information processing apparatus connects the connection unit to the relay device, which is identified by the relay device identification information that is stored in the storage unit associated with the received device specification information. Therefore, in the infrastructure mode, the user can use the device, without considering the relay device connected to the device.

DETAILED DESCRIPTION

Figure 1:
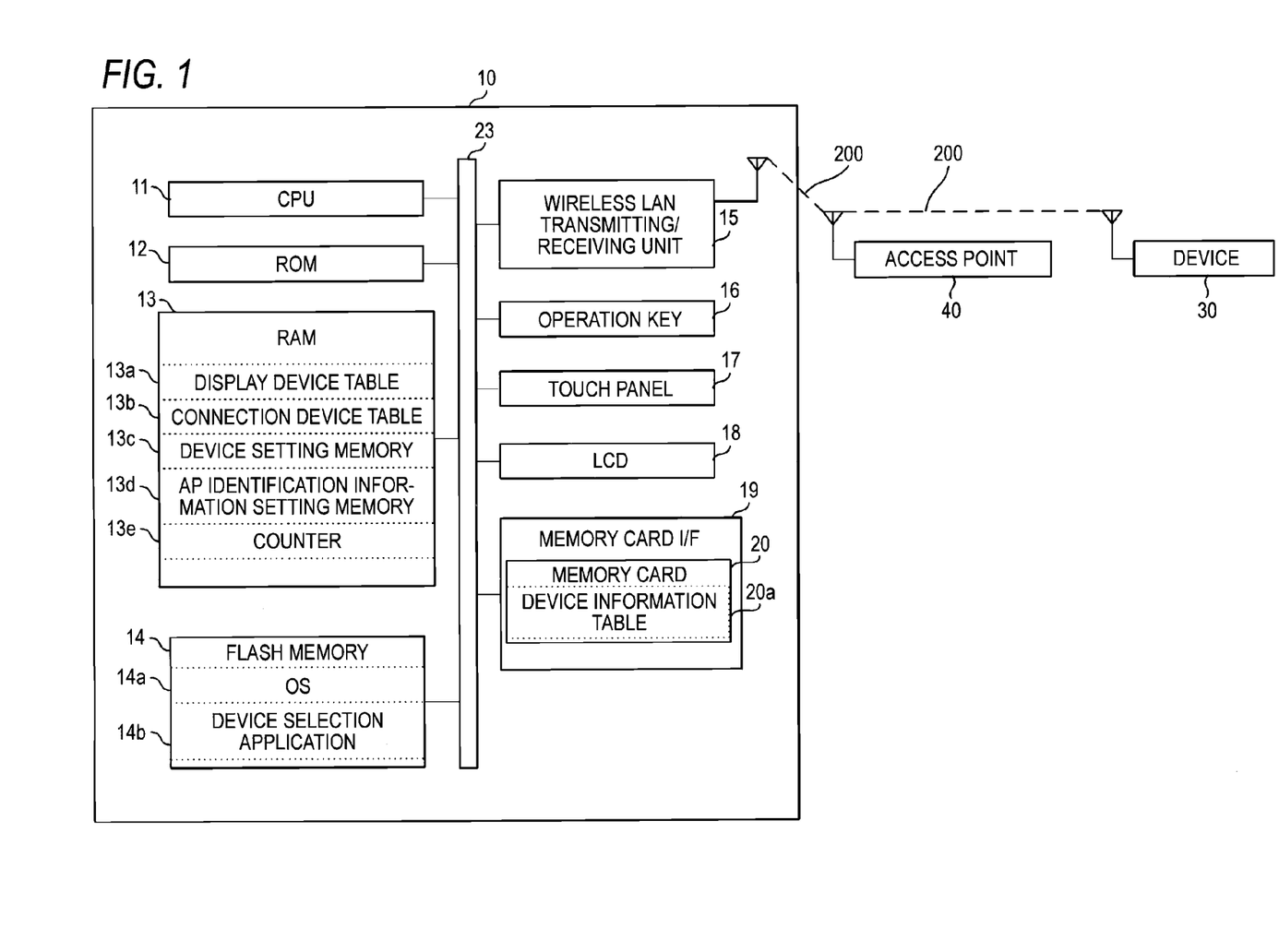
FIG. 1 is a block diagram illustrating an electrical structure of a mobile terminal.

Hereinafter, exemplary embodiments of the invention will be described with reference to the accompanying drawings. FIG. 1 is a block diagram illustrating the electrical structure of a mobile terminal 10 including a device selection application 14*b* (hereinafter, referred to as Application 14*b*) according to a first exemplary embodiment of the invention. The Application 14*b* enables the mobile terminal 10 to select a device which is to be instructed to perform, for example, a printing process or a scanning process from the devices connected to an access point which can be connected.

The mobile terminal 10 performs wireless communication 200 with another apparatus through an access point 40 (hereinafter, referred to as an AP 40) in the infrastructure mode. The mobile terminal 10 includes a CPU 11, a ROM 12, a RAM 13, a flash memory 14, a wireless LAN transmitting/receiving unit 15, an operation key 16, a touch panel 17, a liquid crystal display 18 (hereinafter, referred to as an LCD 18), and a memory card interface 19 (hereinafter, referred to as a memory card I/F 19). These components are connected such that they can communicate with each other through a bus line 23.

The CPU 11 controls each unit connected to the bus line 23, on a basis of fixed values or programs stored in the ROM 12 or the flash memory 14, or on a basis of various kinds of signals transmitted and received by the wireless communication 200.

The ROM 12 is a non-rewritable memory and stores various kinds of fixed values. The RAM 13 is a rewritable volatile memory and includes a display device table 13*a*, a connection device table 13*b*, a device setting memory 13*c*, an AP identification information setting memory 13*d*, and a counter 13*e*. The display device table 13*a* stores the names of the devices which can be used at the current position by the mobile terminal 10, the names of the devices which are unable to be used at the current position by the mobile terminal 10, or data used to display a node name. The connection device table 13*b* stores the model name and IP address of the device 30 which is connected to the AP 40 connected to the mobile terminal 10. The device setting memory 13*c* stores the IP address of the device which receives an instruction to perform, for example, a printing process or a scanning process from the mobile terminal 10. The AP identification information setting memory 13*d* stores the SSID (abbreviation of Service Set Identifier) of the AP 40 to which the mobile terminal 10 is connected via the wireless LAN transmitting/receiving unit 15. The counter 13*e* will be described below.

The flash memory 14 is a rewritable non-volatile memory and stores an operating system 14*a* (hereinafter, referred to as an OS 14*a*) or the Application 14*b*. In this exemplary embodiment, the OS 14*a* is basic software installed in the mobile terminal 10. In this exemplary embodiment, it is assumed that the OS 14*a* is an Android (registered trademark) OS. The Application 14*b* is provided by a bender of the device 30 and is installed in the mobile terminal 10 by the user of the mobile terminal 10.

Each application (including the Application 14*b*) installed in the mobile terminal 10 or software, such as the OS 14*a*, is executed by the CPU 11. The CPU 11 executes the processes indicated by each application or the OS 14*a*, or the API (abbreviation of Application Program Interface) of the OS 14*a* designated by each application so as to control each component of the mobile terminal 10, such as the wireless LAN transmitting/receiving unit 15, the operation key 16, the touch panel 17, the LCD 18, and the memory card I/F 19.

The wireless LAN transmitting/receiving unit 15 is a wireless LAN based on an IEEE 802.11 standard (i.e., IEEE 802.11b/g) and is a circuit for Wi-Fi (registered trademark) connection between the mobile terminal 10 and other apparatuses. The wireless communication 200 between the mobile terminal 10 and the AP 40 can be performed by the wireless LAN transmitting/receiving unit 15.

The LCD 18 displays a list of icons indicating the applications installed in the mobile terminal 10 or the screen of a started application.

The operation key 16 is a keyboard provided in a housing (not shown) of the mobile terminal 10. When the operation key 16 is pressed, a corresponding electric signal is input to the CPU 11. The touch panel 17 is provided so as to overlap the LCD 18. The touch panel 17 is, for example, a capacitance type. When the user touches the touch panel 17, an electric signal corresponding to a touched area is input to the CPU 11. Hereinafter, a process, in which the electric signal corresponding to the touched area is input from the touch panel 17 to the CPU 11 and the CPU 11 determines that information corresponding to the icon displayed on the LCD 18 at that time has been input, is simply represented by 'the CPU 11 determines that there is an input from the touch panel 17.'

The memory card I/F 19 is an interface into which a non-volatile memory card 20 is inserted. The memory card I/F 19 controls the writing or reading of data to or from the memory card 20. The memory card 20 includes a device information table 20*a*. The device information table 20*a* will be described below with reference to FIG. 4A. An example of the memory card 20 is an SD card (registered trademark).

The device 30 is a multi-function device having a printer function, a scanning function, and a copy function. The device 30 includes a wireless LAN transmitting/receiving unit (not shown) having the same structure as the wireless LAN transmitting/receiving unit 15 of the mobile terminal 10. The device 30 is Wi-Fi connected to the mobile terminal 10 through the AP 40 by the wireless communication 200. In addition, the device 30 is controlled by the mobile terminal 10 which reads the Application 14*b* of the mobile terminal 10. The device 30 prints images on the basis of data transmitted from the mobile terminal 10, or reads a document to generate image data and transmits the generated image data to the mobile terminal 10. The AP 40 relays the communication between the mobile terminal 10 and the device 30 using Wi-Fi connection.

The SSID of the AP 40 is set by an administrator. The mobile terminal 10 detects the AP 40 in a range in which the wireless communication 200 can be performed and transmits an instruction to perform, for example, a printing process or a scanning process to the device 30 that can communicate through the detected AP 40. Incidentally, a plurality of devices 30 may be used through the AP 40.

Next, a method of detecting the AP 40 in the range in which the wireless communication 200 can be performed in the mobile terminal 10 will be described. The AP 40 radiates radio waves with a beacon frame including, for example, the SSID or a BSSID (abbreviation of Basic Service Set Identifier) periodically at an interval of about 100 ms. When the wireless LAN transmitting/receiving unit 15 receives the radio waves with the beacon frame, the mobile terminal 10 can specify the AP 40, which is a transmission source, using the SSID or BSSID included in the beacon frame. The radio waves with the beacon frame are gradually attenuated after being transmitted from the AP 40. Therefore, when the distance from the AP 40 increases, it becomes difficult to receive the radio waves. At the position which is a predetermined distance away from the AP 40, it is difficult to receive the radio waves. In general, an area in which the radio waves radiated to a given AP 40 can be received is referred to as the coverage area of the AP 40.

Figure 2:
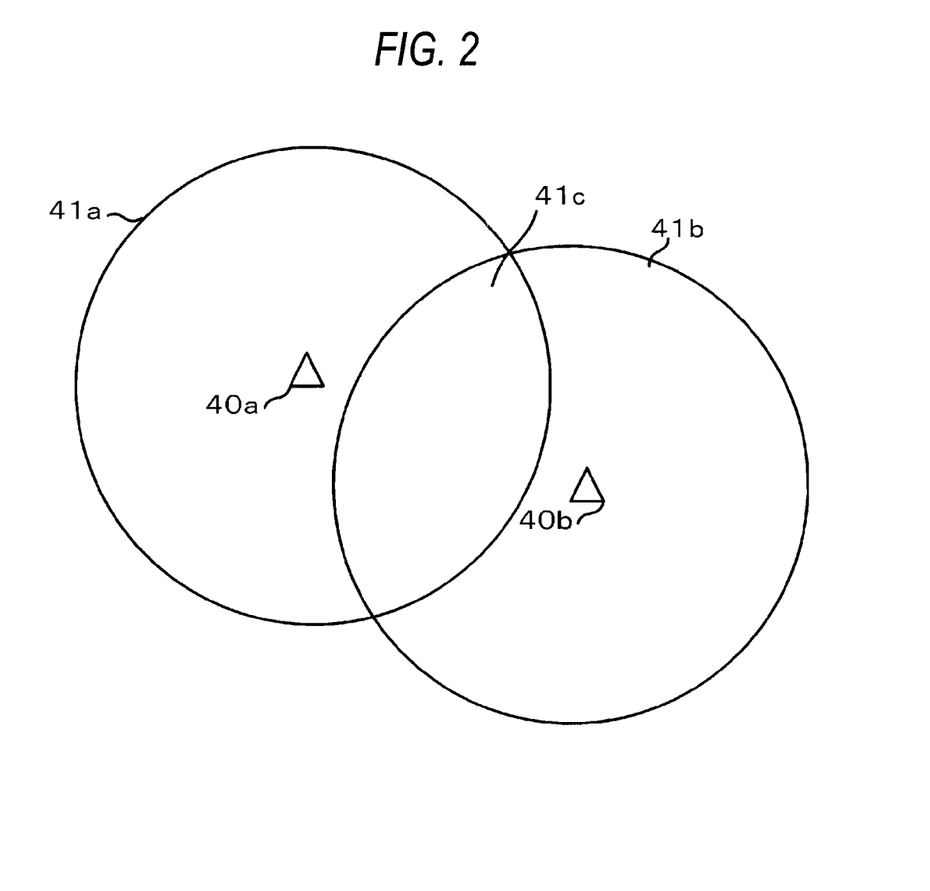
FIG. 2 is a schematic diagram illustrating coverage areas of APs.
Figure 3:
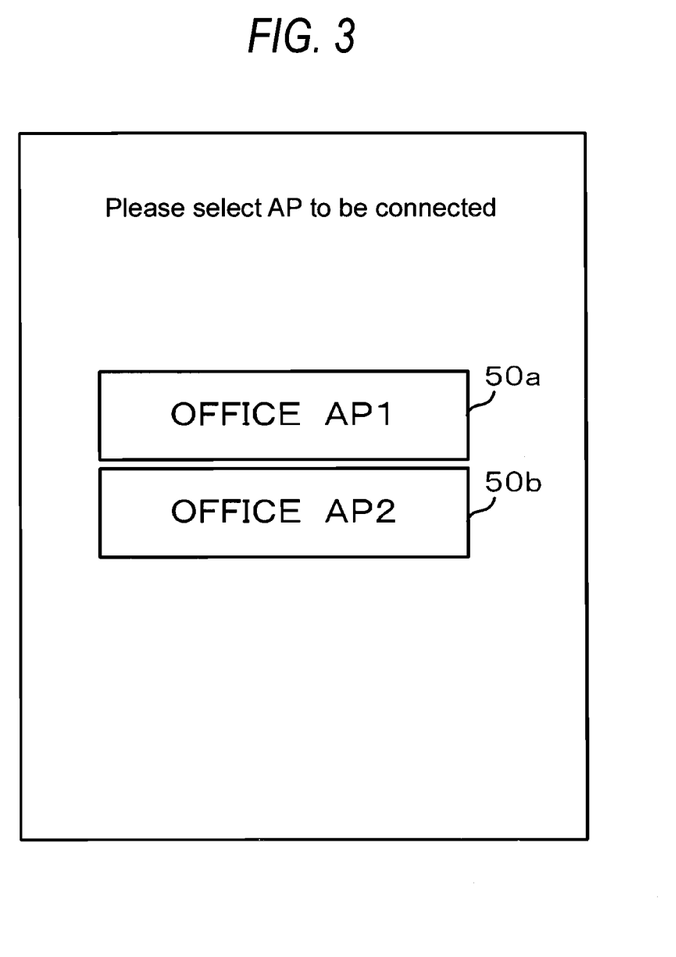
FIG. 3 is a diagram illustrating an example of a selection screen of an AP, which is a connection target, displayed in the mobile terminal.

In FIG. 2, there is a coverage area 41c, which is an overlap between the coverage areas 41a and 41b of two different APs 40a and 40b. When the mobile terminal 10 is disposed in the coverage area 41c, the mobile terminal 10 can receive the radio waves radiated from both the AP 40a and the AP 40b. However, the mobile terminal 10 can perform the wireless communication 200 with one AP 40 at the same time. The mobile terminal 10 displays information shown in FIG. 3 on the LCD 18. In FIG. 3, OFFICE AP1 and OFFICE AP2 of icons 50a and 50b indicate the SSIDs of the AP 40a and the AP 40b, respectively. The user selects the AP 40 which will perform the wireless communication 200 and touches the icon 50 of the selected AP 40. Then, the mobile terminal 10 performs the wireless communication 200 with the AP 40 indicated by the touched icon. In addition, the mobile terminal 10 stores the SSID of the AP 40 which will perform the wireless communication 200 in the AP identification information setting memory 13d. In this exemplary embodiment, for convenience of explanation, it is assumed that the icon 50a of OFFICE AP1 indicating the SSID is touched. The process in which the mobile terminal 10 receives the selection of the AP 40 which will perform the wireless communication 200 is generally programmed in the OS 14a. Hereinafter, the AP 40 with the coverage area 41 in which the mobile terminal 10 is present is referred to as a 'connectable AP 40,' and the AP 40 with which the mobile terminal 10 is performing the wireless communication 200 is referred to as a 'connected AP 40.'

Next, a process in which the mobile terminal 10 instructs the device 30 connected to the connectable AP 40 to perform, for example, a printing process or a scanning process will be described with reference to FIG. 5. The CPU 11 calls the API of the OS 14a according to the Application 14b in order to perform this process. In Step (hereinafter, referred to as S) 100, the CPU 11 displays a list of devices on the LCD 18. This step is a subroutine and will be described in detail below with reference to FIG. 6.

Figure 6:
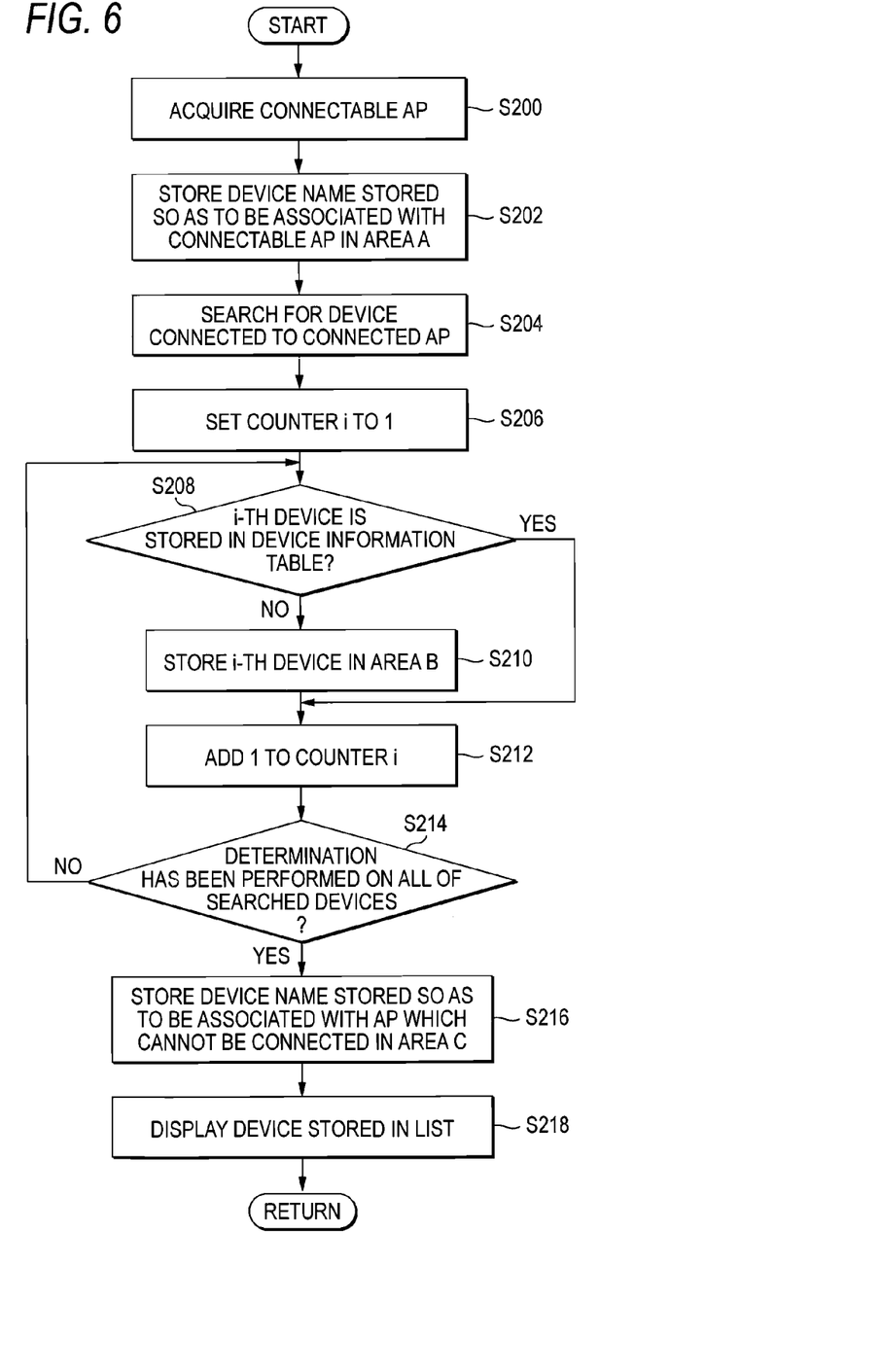
FIG. 6 is a flowchart illustrating a device list process.

In S200, the CPU 11 acquires an SSID from the beacon frame of the connectable AP 40 and proceeds to S202. In S202, the CPU 11 stores the device name stored in the device information table 20a in an area A of the display device table 13a so as to be associated with the SSID acquired in S200.

Figure 4A:
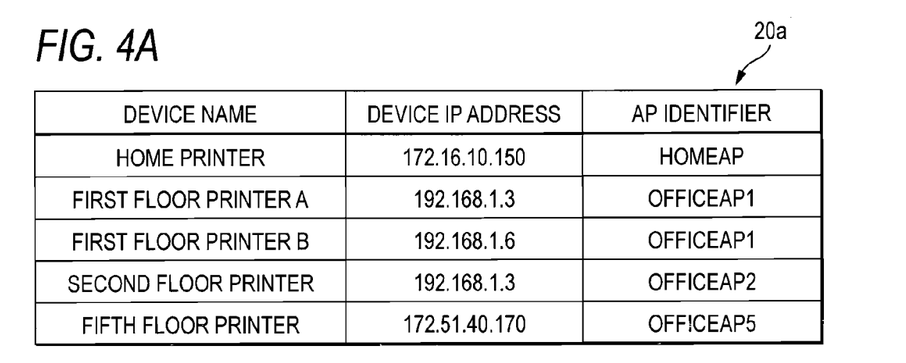
FIG. 4A is a schematic diagram illustrating a device information table.

Next, the device information table 20a will be described with reference to FIG. 4A. In S106 (which will be described in detail below) of the process shown in FIG. 5, the mobile terminal 10 stores the name and IP address of a target device, which is the device 30 instructed to perform, for example, a printing process or a scanning process, and the SSID of the AP 40 to which the mobile terminal 10 is connected at that time in the device information table 20a so as to be associated with each other. Therefore, every time when the process shown in FIG. 5 is performed along the route including S106, the name and IP address of the device and the SSID of the AP40 are stored in the device information table 20a. That is, the name and IP address of the device and the SSID of the AP40 are stored in the device information table 20a by the previous process. However, in the mobile terminal 10 only when the Application 14b is executed first, the device information table 20a is blank.

Figure 4B:
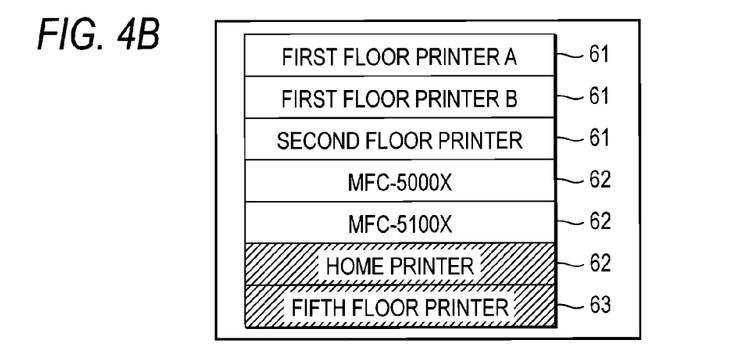
FIG. 4B is a diagram illustrating an example of the display of information on an LCD in S218 of FIG. 6.
Figure 4C:
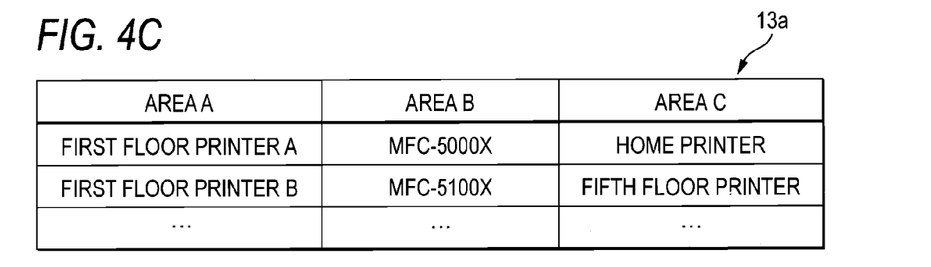
FIG. 4C is a diagram illustrating an example of a display device table.

In this exemplary embodiment, the connectable APs 40 are the AP 40a and the AP 40b, and the SSIDs thereof are "OFFICE AP1" and "OFFICE AP2," respectively. A "first floor printer A" and a "first floor printer B" are stored in the device information table 20a shown in FIG. 4A so as to be associated with "OFFICE An" In addition, a "second floor printer" is stored so as to be associated with "OFFICE AP2." Therefore, as shown in FIG. 4C, three device names are stored in the area A of the display device table 13a.

Figure 4D:
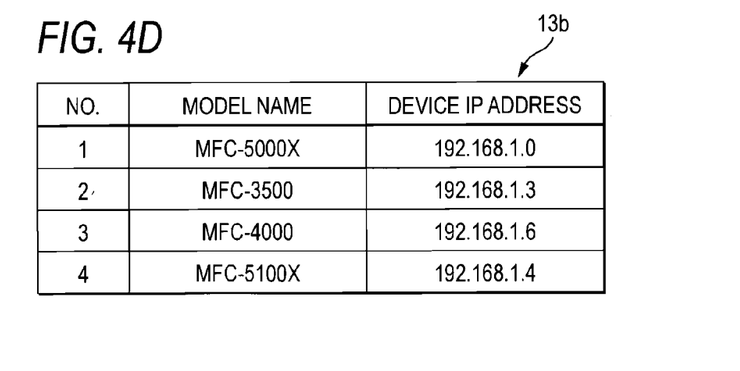
FIG. 4D is a diagram illustrating an example of a connection device table.

Returning to FIG. 6, in S204, the mobile terminal 10 searches for the device 30 which is connected to the connected AP 40. Specifically, the CPU 11 controls the wireless LAN transmitting/receiving unit 15 such that a request to return the model name is broadcasted to the device 30 that is connected to the connected AP 40. Then, the device 30 that is connected to the connected AP 40 returns a signal. Then, the CPU 11 reads the IP address and model name of the device, which is a transmission source of the returned signal, from the packets received by the wireless LAN transmitting/receiving unit 15 and stores the IP address and model name of the device in the connection device table 13b while sequentially allocating numbers thereto. An example of the connection device table 13b is shown in FIG. 4D.

In S206, the CPU 11 sets the value i of the counter 13e to 1, and the CPU 11 proceeds to S208. In S208, the CPU 11 determines whether the IP address of an i-th device with the model name and IP address stored in the connection device table 13b is stored in the device information table 20a. When the determination result in S208 is "Yes," the CPU 11 proceeds to S212. When the determination result in S208 is "No," the CPU 11 proceeds to S210.

In S210, the CPU 11 stores the model name of the i-th device stored in the connection device table 13b in an area B of the display device table 13a. Then, the CPU 11 proceeds to S212.

In S212, the CPU 11 adds 1 to the value i of the counter 13e. Then, the CPU 11 proceeds to S214. In S214, the CPU 11 determines whether to perform the determination in S208 on all of the devices searched in S204, that is, all of the devices with the model names and IP addresses stored in the connection device table 13b. Specifically, when the value i of the counter 13e is greater than the value which is allocated as a number to the device with the model name and IP address stored in the connection device table 13b, the determination result in S214 is "Yes," and the CPU 11 proceeds to S216. On the other hand, when the value i of the counter 13e is equal to or less than the value which is allocated as a number to the device with the model name and IP address stored in the connection device table 13b, the determination result in S214 is "No," and the CPU 11 proceeds to S208. In this exemplary embodiment, as shown in FIG. 4C, the model names of two devices which are connected to the AP 40a having OFFICE AP1 as the SSID and whose device name and IP address are not stored in the device information table 20a are stored in the area B of the display device table 13a.

In S216, the CPU 11 reads the name of the device that is stored in the device information table 20a so as to be associated with the SSID of the unconnectable AP 40, and the CPU 11 stores the read device name in an area C of the display device table 13a. In this exemplary embodiment, as shown in FIG. 4C, device names "home printer" and "fifth floor printer," which are stored in the device information table 20*a* so as to be associated with "HOME AP" and "OFFICE AP5" that are the SSIDs of the unconnectable APs 40, are stored in the area C of the display device table 13*a*. The CPU 11 proceeds to S218.

In S218, the CPU 11 displays the device name or the model name of the device on the LCD on the basis of the display device table 13*a*. An example of the display is shown in FIG. 4B. Icons 61, 62, and 63 indicates information items displayed on the basis of the device names or the model names of the devices stored in the areas A, B, and C of the display device table 13*a*. The icon 61 and the icon 62 are displayed in black and the icon 63 is displayed in gray (in FIG. 4B, the background of the icon 63 is hatched). The device names or the model names of the devices stored in the areas A and B of the display device table 13*a* are of the devices connected to the connected AP 40 or the connectable AP 40. On the other hand, the device name stored in the area C is of the device connected to the unconnectable AP 40. That is, the device with the device name indicated by the icon 62 is unable to be used at present. In the mobile terminal 10 according to this exemplary embodiment, the icon indicating the device name is displayed in gray. Therefore, the user can intuitively understand that the icon indicates the device name of the device which is unable to be used.

Figure 5:
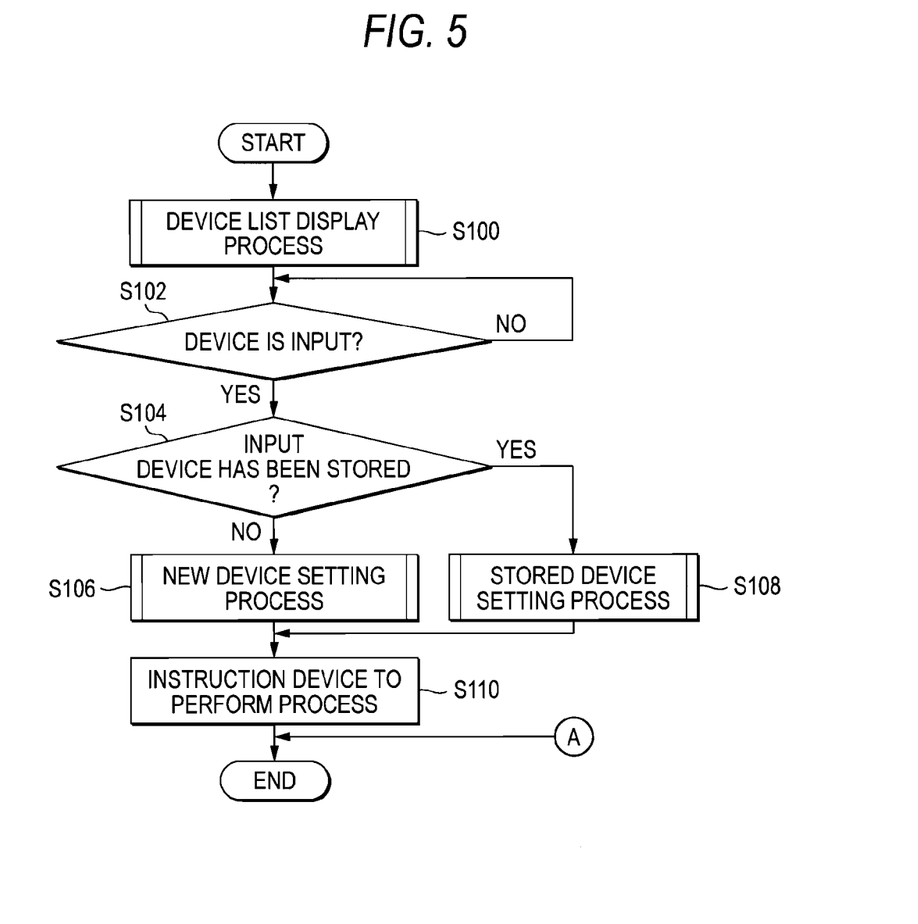
FIG. 5 is a flowchart illustrating a process of instructing a device connected to the AP to which the mobile terminal can be connected to perform a process.

When S218 is performed, the CPU 11 ends the subroutine of the device list display process shown in FIG. 6 and returns to the process shown in FIG. 5. In S102, the CPU 11 determines whether designation of the device name or the model name of the device indicated by the icon 61 or the icon 62 shown in FIG. 4B is input. When the determination result in S102 is "Yes," the CPU 11 proceeds to S104. On the other hand, when the determination result in S102 is "No," the CPU 11 repeatedly performs the determining process. In S102, even when an electric signal corresponding to the area in which the icon 63 is displayed is input from the touch panel 17 to the CPU 11, the CPU 11 does not particularly perform any process. Therefore, even when the user erroneously touches the icon 63, it is possible to prevent an error in which an instruction to perform a printing process or a scanning process is transmitted to an unavailable device.

In S104, the CPU 11 determines whether the device input in S102 has been stored in the device information table 20*a*. Specifically, when the icon 61 is touched to input the device name or the input model name of the device, the CPU 11 determines that the input device name or the input model name of the device is stored in the device information table 20*a*. When the icon 62 is touched to input the device name or the input model name of the device, the CPU 11 determines that the input device name or the input model name of the device is not stored in the device information table 20*a*. When the determination result in S104 is "Yes," the CPU 11 proceeds to S108. On the other hand, when the determination result in S104 is "No," the CPU 11 proceeds to S106.

A new device setting process in S106 and a stored device setting process in S108 are subroutines. Next, the new device setting process in S106 will be described with reference to FIG. 7, and the stored device setting process will be described with reference to FIG. 8.

First, the new device setting process will be described with reference to FIG. 7. In S300, the CPU 11 displays a device name input instruction screen (not shown) on the LCD 18. In this case, a software keyboard is displayed on the touch panel 17. The user can input any character string as the device name to the model name of the device 30 selected in S102. In S302, the CPU 11 determines whether the device name is input. When the determination result in S302 is "Yes," the CPU 11 proceeds to S304. On the other hand, when the determination result in S302 is "No," the CPU 11 proceeds to S302 and repeatedly performs the determining process.

In S304, the CPU 11 stores the device name which has been determined to be input in S302, the IP address of the device input in S102, and the SSID stored in the AP identification information setting memory 13*d* in the device information table 20*a* so as to be associated with each other. Then, the CPU 11 proceeds to S306.

In S306, the CPU 11 stores the IP address of the device input in S102 in the device setting memory 13*c*. Then, the CPU 11 ends the new device setting process shown in FIG. 7 and returns to the process shown in FIG. 5.

Figure 8:
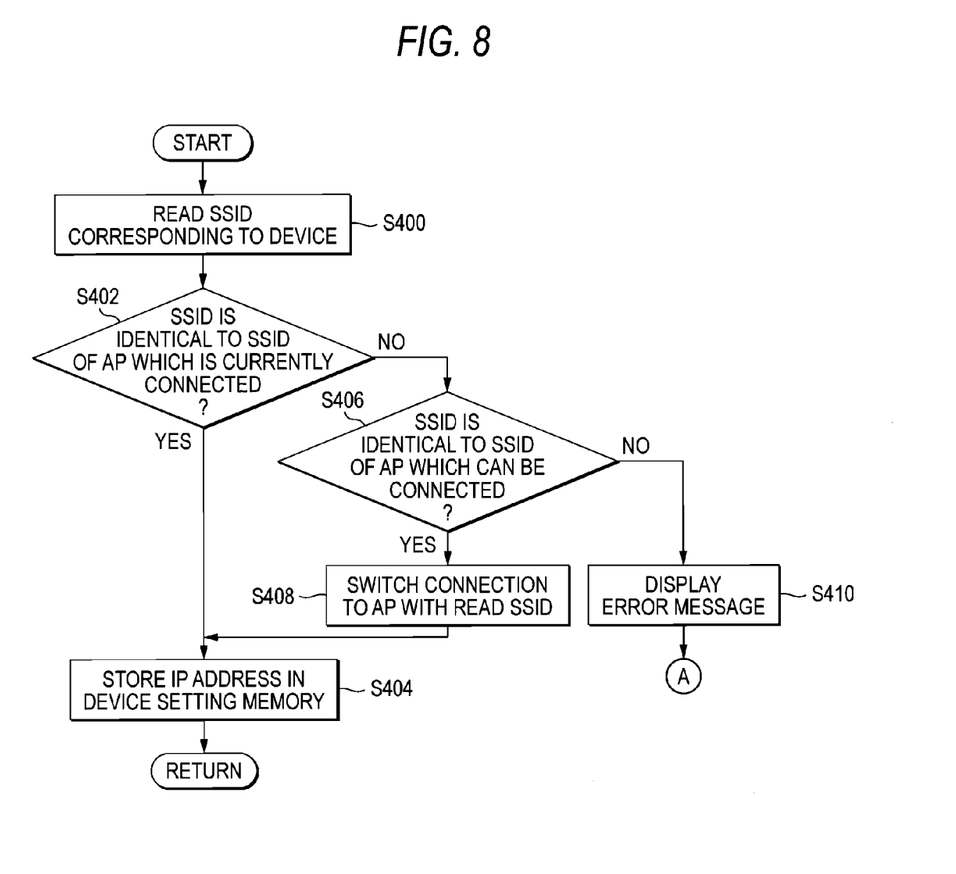
FIG. 8 is a flowchart illustrating a stored device setting process.

Next, the stored device setting process will be described with reference to FIG. 8. First, in S400, the CPU 11 reads the SSID which is stored so as to be associated with the device name input in S102 of FIG. 5 with reference to the device information table 20*a*. Then, the CPU 11 proceeds to S402.

In S402, the CPU 11 determines whether the SSID of the AP 40 to which the mobile terminal 10 is being connected is identical to the SSID of the AP 40 to which the device input in S102 of FIG. 5 is connected, that is, the SSID read in S400. As described above, the SSID of the AP 40 to which the mobile terminal 10 is connected is stored in the AP identification information setting memory 13*d*. When the determination result in S402 is "Yes," the CPU 11 proceeds to S404. On the other hand, when the determination result in S402 is "No," the CPU 11 proceeds to S406.

In S406, the CPU 11 determines whether the SSID read in S400 is the SSID of the AP 40 which the mobile terminal 10 can be currently connectable to. The SSID of the connectable AP 40 can be acquired by the same method as that in S200 of FIG. 6. When the determination result in S406 is "Yes," the CPU 11 proceeds to S408. On the other hand, when the determination result in S406 is "No," the CPU 11 proceeds to S410. In S410, the CPU 11 displays an error message on the LCD 18, moves to the state after the final step of the process shown in FIG. 5 is performed, and ends the process shown in FIG. 5. A case in which the determination result in S406 becomes "No" and the CPU 11 proceeds to S410 means, the AP 40 which has been determined to be connectable in the device list display process shown in FIG. 5 is determined not to be connectable due to the movement of the user in S406. Therefore, the user needs to perform the process shown in FIG. 5 again.

In S408, the CPU 11 connects the mobile terminal 10 to the AP 40 with the SSID read in S400. Then, the CPU 11 overwrites the SSID of the AP 40 which is newly connected to the mobile terminal 10 to the AP identification information setting memory and stores the SSID of the newly connected AP 40. Then, the CPU 11 proceeds to S404.

In S404, the CPU 11 reads the IP address of the device with the device name which is input in S102 of FIG. 5 from the device information table 20*a* and stores the read IP address in the device setting memory 13*c*. Then, the CPU 11 ends the stored device setting process shown in FIG. 8 and returns to the process shown in FIG. 5.

Returning to FIG. 5, in S110, the CPU 11 controls the wireless LAN transmitting/receiving unit 15 such that an instruction to perform, for example, a printing process or a scanning process is transmitted to the device with the IP address stored in the device setting memory 13*c* through the connected AP 40.

As such, the user can select the device 30 to perform a printing process or a scanning process, without considering the connected AP 40, only by selecting the icon 61 indicating the device name of the device 30 or the icon 62 (see FIG. 4B)

indicating the model name of the device 30 which is displayed on the LCD 18 in S218 of FIG. 6.

The invention is not limited to the above-described exemplary embodiments, and various modifications and changes of the invention can be made without departing from the scope and spirit of the invention.

For example, in the above-described exemplary embodiments, the mobile terminal 10 is an example of the information processing apparatus. However, various kinds of apparatuses, such as personal computers, may be an example of the information processing apparatus.

In the above-described exemplary embodiments, the printing process and the scanning process are prepared as the processes which can be performed by the device 30 in response to instructions from the Application 14b. However, the Application 14b may be configured so as to instruct the device 30 to perform, for example, a FAX transmitting process and a FAX receiving process.

In the above-described exemplary embodiments, the SSID is used as relay device identification information. However, a BSSID may be used instead of the SSID.

In the display (see FIG. 4B) of information on the LCD 18 in S218 of the device list display process shown in FIG. 6, the icon 62 indicating the model name of the device connected to the connected AP 40 may be changed to an icon indicating an unique information of the device (i.e., a node name or a serial number of the device) connected to the connected AP 40. In this case, in S204 of FIG. 6, the CPU 11 may control the wireless LAN transmitting/receiving unit 15 such that a return request which is broadcasted to the device 30 connected to the AP 40 is replaced with a request to return the node name or the serial number.

In the above-described exemplary embodiments, in S304 of a subroutine process (see FIG. 7) of the new device setting process in S106 of FIG. 5, the device name which has been input by the user in S302 is stored in the device information table 20a. Instead of the process, the model name of the device may be stored. The new device setting process when the model name of the device is stored will be described with reference to FIG. 9.

Figure 9:
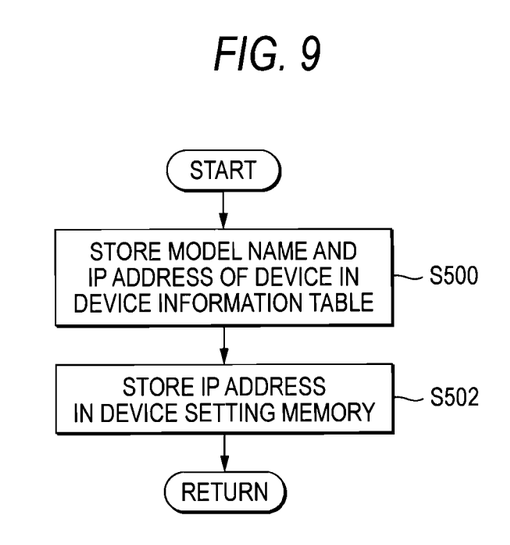
FIG. 9 is a flowchart illustrating a modification of the new device setting process.

In S500, the CPU 11 reads the IP address of the device input in S102 of FIG. 5 from the connection device table 13b. Then, the CPU 11 stores the model name and IP address of the device in the device information table 20a. Then, the CPU 11 proceeds to S502. The process in S502 is the same as that in S306 and thus the detailed description thereof will not be repeated. When S502 is performed, the CPU 11 ends the new device process and returns to the process shown in FIG. 5. Incidentally, in S500, the node name and IP address of the device may be stored in the device information table 20a.

In the above-described exemplary embodiments, in the process of S216 in FIG. 6, the device name of the device stored in the area C of the display device table 13a is displayed in gray (see FIG. 4B). Alternatively, it may be configured not to display the device name of the device stored in the area C. In addition, the process of S216 may not be performed. According to this structure, it is possible to prevent the user from selecting the device which is unable to be currently used by mistake.

In the above-described exemplary embodiments, the process shown in FIG. 5 starts in a state in which the mobile terminal 10 is connected to the AP 40. Alternatively, the process shown in FIG. 5 may start in a state in which the mobile terminal 10 is not connected to the AP 40. In this case, in the process shown in FIG. 6, it is not necessary to perform the process in S204 to S214.

In the above-described exemplary embodiments, the device information table 20a is stored in the memory card 20. Alternatively, the device information table 20a may be stored in the flash memory 14, instead of the memory card 20.

Figure 7:
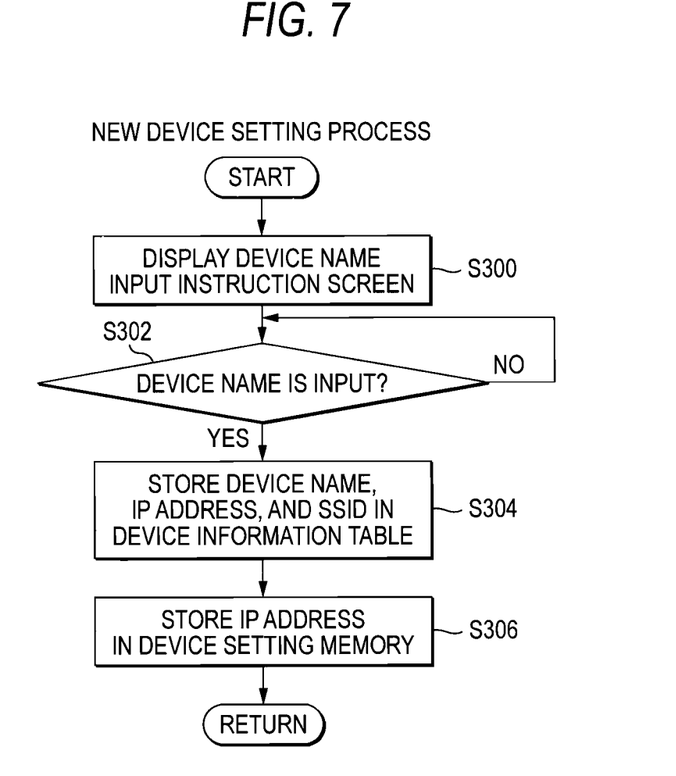
FIG. 7 is a flowchart illustrating a new device setting process.

In the above-described exemplary embodiments, in S204 of FIG. 7, the CPU 11 reads the IP address and model name of the device, which is a transmission source, from the packets received by the wireless LAN transmitting/receiving unit 15 and stores the IP address and model name of the device in the connection device table 13b while sequentially allocating numbers thereto. Alternatively, the CPU 11 may store the node name or serial number of the device, which is a transmission source, instead of the IP address of the device which is a transmission source. When the CPU 11 stores the node name or serial number of the device, which is a transmission source, the exemplary embodiment may be changed as follows.

In S204, the CPU 11 directs the wireless LAN transmitting/receiving unit 15 to transmit a request to return the node name or serial name of the device 30 connected to the AP 40, in addition to the request to return the model name which is broadcasted to the device 30. Then, the CPU 101 stores the node name or serial number of the device read from the packets which are returned from the device in response to the transmitted request to return the node name or serial name of the device in an area of the device information table 20a corresponding to a device IP address.

In S208, the CPU 11 determines whether the node name or serial number of an i-th device whose model name and node name, or serial number is stored in the connection device table 13b is stored in the device information table 20a.

In S304, the CPU 11 stores the device name which has been determined to be input in S302, the node name or serial number of the device input in S102, and the SSID stored in the AP identification information setting memory 13d in the device information table 20a so as to be associated with each other.

According to another illustrative aspect of the invention, the operations further comprise a receiving process of making the connection unit to receive the relay device identification information included in a signal output from the relay device. The display process displays a first specification information, which is device specification information stored in the storage unit so as to be associated with relay device identification information included in the signal received by the receiving process in a predetermined period.

According thereto, the user can select the device connected to the relay device to which the information processing apparatus can be connected.

According to still another illustrative aspect of the invention, the display process displays a second specification information, which is device specification information stored in the storage unit so as to be associated with relay device identification information which is not included in the signal received by the receiving process for the predetermined period, distinctively from the first specification information.

According thereto, the user can distinguish the device connected to the relay device to which the information processing apparatus can be connected from the device connected to the relay device to which the information processing apparatus is unable to connect.

According to still another illustrative aspect of the invention, the accepting process accepts the first specification information and does not accept the second specification information.

According thereto, even when the user mistakenly selects the device connected to the relay device to which the information processing apparatus is unable to connect, the information processing apparatus does not perform an unnecessary process of attempting connection to the unconnectable relay device. Therefore, it is possible to reduce the processing load of the information processing apparatus due to the unnecessary process.

According to still another illustrative aspect of the invention, the operations further comprise a determining process for determining whether the relay device identification information stored in the storage unit so as to be associated with the device specification information accepted by the accepting process is identical to the relay device identification information for identifying the relay device that the connection unit is connected to. When the determining process determines that the relay device identification information items are not identical to each other, the connection process connects the connection unit to the relay device identified by the relay device identification information stored in the storage unit so as to be associated with the device specification information accepted by the accepting process. When the determining process determines that the relay device identification information items are identical to each other, the connection process maintains the connection of the relay device that the connection unit is connected to.

According thereto, the information processing apparatus can appropriately control the connection unit on the basis of whether the connected relay device is identical to the relay device, which is identified by the relay device identification information that is stored in the storage unit associated with the received device specification information.

According to still another illustrative aspect of the invention, the operations further comprise an acquiring process of acquiring device identification information for identifying the device connected to the relay device that the connection unit is connected to. The display process displays the device identification information in addition to the device specification information stored in the storage unit. When accepting the device identification information, the accepting process further accepts an arbitrary character string. The storage control process stores the character string accepted by the accepting process as specification information of the device identified by identification information accepted by the receiving process in the storage unit so as to be associated with the relay device identification information of the connected relay device.

According thereto, the information processing apparatus can use the character string selected by the user as the device specification information.

According to still another illustrative aspect of the invention, the acquiring unit acquires unique information of the device which is connected to the relay device that the connection unit is connected to. The storage control process stores the device specification information, the relay device identification information, and the unique information of the device in the storage unit. When the unique information of the device acquired by the acquiring unit is stored in the storage unit, the display process displays the unique information of the device instead of the device identification information of the device.

According thereto, when the unique information of the device acquired by the acquiring unit is stored in the storage unit, the information processing apparatus gives priority to the device specification information over the device identification information in the display. Therefore, it is easy for the user to select the device.

What is claimed is:

1. A non-transitory computer-readable medium having information processing instructions stored thereon and readable by a computer mounted in an information processing apparatus comprising a connection unit configured to establish a wireless connection with a relay device that a target device is wirelessly connected to, the connection unit being configured to establish the wireless connection with one relay device from among a plurality of relay devices, the respective coverage areas of which include the information processing apparatus, the information processing instructions, when executed by the computer, cause the computer to perform operations comprising:

a storage control process of, upon receiving an instruction for using the target device that is wirelessly connected to the relay device in a state in which the information processing apparatus is connected to the relay device, storing device specification information for specifying the target device and relay device identification information for identifying the relay device in a storage unit so as to be associated with each other;

a display process of displaying on a display unit a plurality of the device specification information including:

a first device specification information specifying a first target device that is wirelessly connected to a first relay device that the connection unit is being connected to and a second device specification information specifying a second target device stored in the storage unit, wherein the second target device was instructed to be used by the information processing apparatus in a state in which the second target device was wirelessly connected to a second relay device and the connection unit was wirelessly connected to the second relay device, and wherein the information processing apparatus is included in the coverage area of the second relay device and the connection unit is not wirelessly connected to the second relay device;

an accepting process of accepting designation of the device specification information from the plurality of the device specification information displayed on the display unit by the display process through an input unit; and an instruction transmitting process comprising:

transmitting an instruction to the first target device through the first relay device to use the first target device, in response to the first device specification information being designated by the accepting process;

connecting the connection unit to the second relay device and transmitting the instruction to the second target device through the second relay device to use the second target device, in response to the second device specification information being designated by the accepting process;

a determining process for determining whether a first relay device identification information, which is the relay device identification information stored in the storage unit so as to be associated with the designated device specification information accepted by the accepting process, is identical to a second relay device identification information, which is the relay device identification information for identifying the relay device that the connection unit is connected to, wherein when the determining process determines that the first relay device identification information and the second relay device identification information are not identical to each other, the connection process connects the connection unit to the relay device identified by the first relay device identification information, and wherein when the determining process determines that the first relay device identification information and the second relay device identification information are identical to each other, the connection process maintains the connection of the relay device that the connection unit is connected to.

2. The non-transitory computer-readable medium according to claim 1, wherein the operations further comprise:
a receiving process in which the connection unit receives the relay device identification information included in a signal output from the relay device, and
wherein the display process displays specification information, which is device specification information stored in the storage unit so as to be associated with relay device identification information included in the signal received by the receiving process in a predetermined period.

3. The non-transitory computer-readable medium according to claim 1,
wherein the display process displays a first specification information, which is device specification information stored in the storage unit so as to be associated with relay device identification information included in the signal received by the receiving process in a predetermined period, in a first style, and
wherein the display process displays a second specification information, which is device specification information stored in the storage unit so as to be associated with relay device identification information which is not included in the signal received by the receiving process for the predetermined period, in a second style that is different from the first style.

4. The non-transitory computer-readable medium according to claim 2,
wherein the accepting process accepts the first device specification information and does not accept the second device specification information.

5. The non-transitory computer-readable medium according to claim 1, wherein the operations further comprise:
an acquiring process of acquiring device identification information for identifying the target device connected to the relay device that the connection unit is connected to,
wherein the display process displays the device identification information in addition to the device specification information stored in the storage unit,
wherein when accepting the device identification information, the accepting process further accepts an arbitrary character string, and
wherein the storage control process stores the arbitrary character string accepted by the accepting process as specification information of the target device identified by identification information accepted by the receiving process in the storage unit so as to be associated with the relay device identification information of the connected relay device.

6. The non-transitory computer-readable medium according to claim 5,
wherein the acquiring process acquires unique information of the target device which is connected to the relay device that the connection unit is connected to,
wherein the storage control process stores the device specification information, the relay device identification information, and the unique information of the target device in the storage unit, and wherein when the unique information of the target device acquired by the acquiring unit is stored in the storage unit, the display process displays the unique information of the target device instead of the device identification information of the target device.

7. A non-transitory computer-readable medium having information processing instructions stored thereon and readable by a computer mounted in an information processing apparatus comprising a connection unit configured to establish a wireless connection with a relay device that a target device is wirelessly connected to, the connection unit being configured to establish the wireless connection with one relay device from among a plurality of relay devices, the respective coverage areas of which include the information processing apparatus, the information processing instructions, when executed by the computer, cause the computer to perform operations comprising:
a storage control process of, upon receiving an instruction for using the target device that is wirelessly connected to the relay device in a state in which the information processing apparatus is connected to the relay device, storing device specification information for specifying the target device and relay device identification information for identifying the relay device in a storage unit so as to be associated with each other;
a display process of displaying on a display unit a plurality of the device specification information including:
a first device specification information specifying a first target device that is wirelessly connected to a first relay device that the connection unit is being connected to; and
a second device specification information specifying a second target device stored in the storage unit,
wherein the second target device was instructed to be used by the information processing apparatus in a state in which the second target device was wirelessly connected to a second relay device and the connection unit was wirelessly connected to the second relay device, and
wherein the information processing apparatus is included in the coverage area of the second relay device and the connection unit is not wirelessly connected to the second relay device;
an accepting process of accepting designation of the device specification information from the plurality of the device specification information displayed on the display unit by the display process through an input unit; and
an instruction transmitting process comprising:
transmitting an instruction to the first target device through the first relay device to use the first target device, in response to the first device specification information being designated by the accepting process;
connecting the connection unit to the second relay device and transmitting the instruction to the second target device through the second relay device to use the second target device, in response to the second device specification information being designated by the accepting process;
wherein the display process further comprises displaying on the display unit a third device specification information specifying a third target device in addition to the first device specification information and the second device specification information, wherein the third target device was instructed to be used by the information processing apparatus in a state in which the third target device was wirelessly connected to a third relay device and the connection unit was wirelessly connected to the third relay device, and wherein the information processing apparatus is not included in the coverage area of the third relay device and the connection unit is not wirelessly connected to the third relay device, wherein the accepting process is configured to accept the first device specification information and the second device specification information through a touch input, and wherein the accepting process is configured not to accept the third device specification information through the touch input.

8. The non-transitory computer-readable medium according to claim 7, wherein the storage control process comprises storing a fourth device specification information for specifying the fourth target device and the first relay device identification information in the storage unit so as to be associated with each other, in response to a device specification information specifying a fourth target device other than the first target device and the second target device.

9. An information processing apparatus comprising:

a storage unit configured to, upon receipt of an instruction for using a target device that is wirelessly connected to a relay device in a state in which the information processing apparatus is connected to the relay device, store:
  device specification information for specifying the target device; and
  relay device identification information for identifying the relay device so as to be associated with each other;

a display unit configured to display a plurality of the device specification information including:
  a first device specification information specifying a first target device that is wirelessly connected to a first relay device that the connection unit is being connected to and
  a second device specification information specifying a second target device stored in the storage unit,
    wherein the second target device was instructed to be used by the information processing apparatus in a state in which the second target device was wirelessly connected to a second relay device and the connection unit was wirelessly connected to the second relay device, and
    wherein the information processing apparatus is included in the coverage area of the second relay device and the connection unit is not wirelessly connected to the second relay device;

an accepting unit configured to accept designation of the device specification information from the plurality of the device specification information displayed by the display unit; and an instruction transmitting unit configured to:
  transmit an instruction to the first target device through the first relay device to use the first target device, in response to the first device specification information being designated by the accepting unit; and
  establish a connection with the second relay device and transmit the instruction to the second target device through the second relay device to use the second target device, in response to the second device specification information being designated by the accepting unit wherein the display unit is configured to display a third device specification information specifying a third target device in addition to the first device specification information and the second device specification information, wherein the third target device was instructed to be used by the information processing apparatus in a state in which the third target device was wirelessly connected to a third relay device and the connection unit was wirelessly connected to the third relay device, and wherein the information processing apparatus is not included in the coverage area of the third relay device and the connection unit is not wirelessly connected to the third relay device, wherein the accepting unit is configured to accept the first device specification information and the second device specification information through a touch input, and wherein the accepting unit is configured not to accept the third device specification information through the touch input.

10. The information processing apparatus according to claim 9, wherein the storage unit is configured to store a fourth device specification information for specifying the fourth target device and the first relay device identification information so as to be associated with each other.

11. An information processing method configured to be performed by an information processing apparatus comprising a connection unit configured to establish a wireless connection with a relay device that a target device is connected to, the information processing method comprising:

a storage control step of, upon receiving an instruction for using the target device that is wirelessly connected to the relay device in a state in which the information processing apparatus is connected to the relay device, storing device specification information for specifying the target device and relay device identification information for identifying the relay device in a storage unit so as to be associated with each other;

a display step of displaying on a display unit a plurality of the device specification information including:
  a first device specification information specifying a first target device that is wirelessly connected to a first relay device that the connection unit is being connected to; and
  a second device specification information specifying a second target device stored in the storage unit, wherein the second target device was instructed to be used by the information processing apparatus in a state in which the second target device was wirelessly connected to a second relay device and the connection unit was wirelessly connected to the second relay device, and wherein the information processing apparatus is included in the coverage area of the second relay device but the connection unit is not wirelessly connected to the second relay device;

an accepting step of accepting designation of the device specification information from the plurality of the device specification information displayed on the display unit through an input unit; and an instruction transmitting step comprising:
  transmitting an instruction to the first target device through the first relay device to use the first target device, in response to the first device specification information being designated by the accepting process; and
  connecting the connection unit to the second relay device and transmitting the instruction to the second target device through the second relay device to use the second target device, in response to the second device specification information being designated by the accepting process;

wherein the display step further comprises displaying on the display unit a third device specification information specifying a third target device in addition to the first device specification information and the second device specification information, wherein the third target device was instructed to be used by the information processing apparatus in a state in which the third target device was wirelessly connected to a third relay device and the connection unit was wirelessly connected to the third relay device, and wherein the information processing apparatus is not included in the coverage area of the third relay device and the connection unit is not wirelessly connected to the third relay device, wherein the accepting step is configured to accept the first device specification information and the second device specification information through a touch input, and wherein the accepting step is configured not to accept the third device specification information through the touch input.

12. The information processing method according to claim 11, wherein the storage control step comprises storing a fourth device specification information for specifying the fourth target device and the first relay device identification information in the storage unit so as to be associated with each other, in response to a device specification information specifying a fourth target device other than the first target device and the second target device.

* * * * *